Aug. 26, 1924.  
C. HAMMOND ET AL  
1,506,174  
COMBINATION LUGGAGE CARRIER AND BED  
Filed Sept. 20, 1922  
2 Sheets-Sheet 1
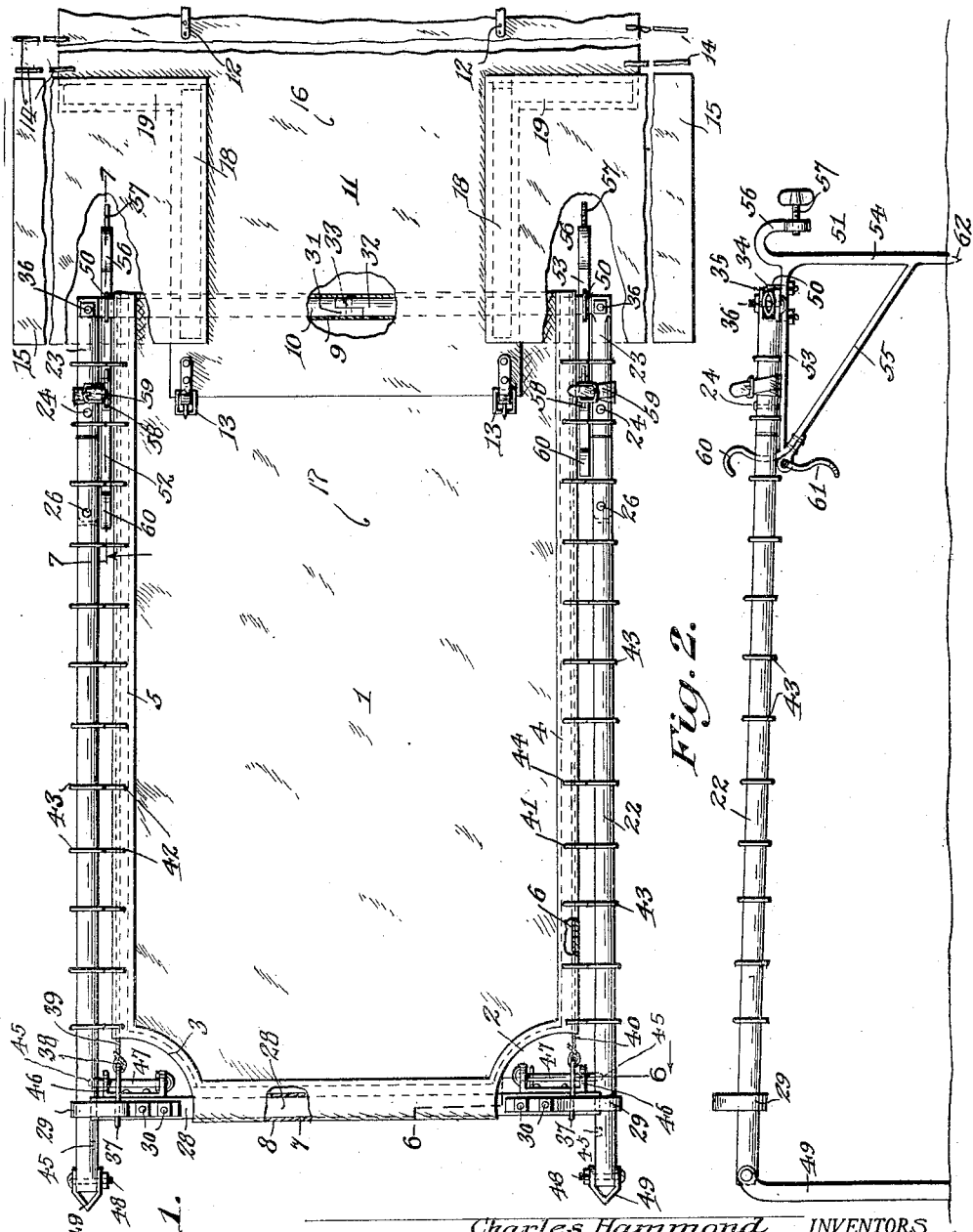
Charles Hammond  
Lawrence S. Ogle.  
INVENTORS
BY  
Geo. P. Kimmel  
ATTORNEY

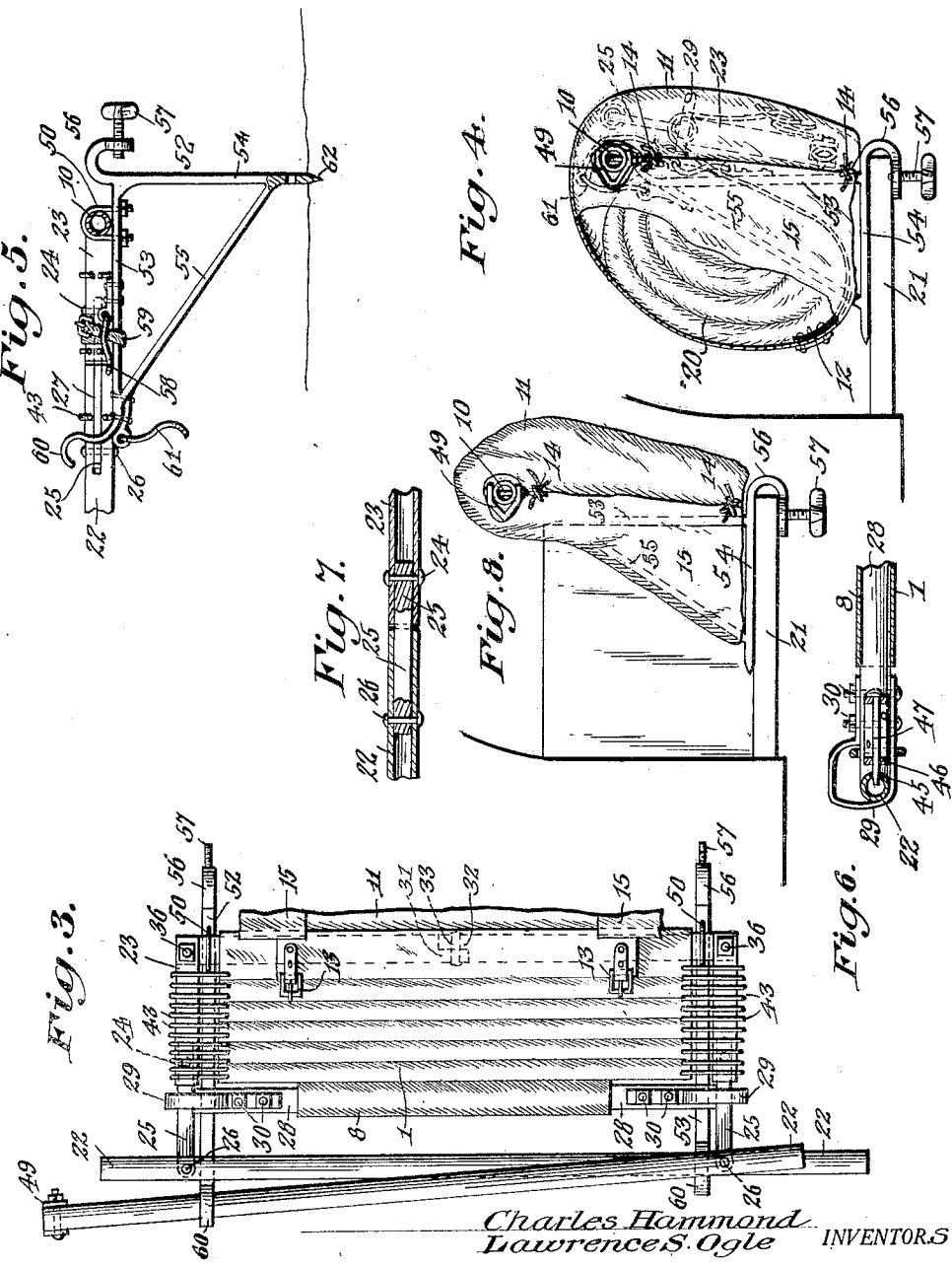

Patented Aug. 26, 1924.

1,506,174

UNITED STATES PATENT OFFICE.

CHARLES HAMMOND AND LAWRENCE S. OGLE, OF PHOENIX, ARIZONA, ASSIGNORS OF ONE-HALF TO J. A. KLEINSMID AND E. F. EVANTS, BOTH OF PHOENIX, ARIZONA.

COMBINATION LUGGAGE CARRIER AND BED.

Application filed September 20, 1922. Serial No. 589,482.

*To all whom it may concern:*

Be it known that we, CHARLES HAMMOND and LAWRENCE S. OGLE, citizens of the United States, residing at Phoenix, in the county of Maricopa and State of Arizona, have invented certain new and useful Improvements in Combination Luggage Carriers and Beds, of which the following is a specification.

This invention relates to a convertible camp bed and luggage carrier or retainer device, designed primarily for use as a motor vehicle accessory or attachment, but it is to be understood that the device can be employed for any purposes wherein it is found applicable, and the invention has for its object to provide, in a manner as hereinafter set forth, a convertible bed and luggage retainer which may be interchangeably used as a bed when extended, or when folded conveniently and detachably secured to the running board of a motor vehicle to constitute a luggage carrier or retainer.

Further objects of the invention are to provide a device of the type referred to, which is simple in its construction and arrangement, strong, compact when folded, durable, efficient and convenient in its use, readily secured when folded to the running board of a motor vehicle, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a top plan view, broken away, of a convertible camp bed and luggage carrier or retainer device, in accordance with this invention, the device being extended to provide a bed, Figure 2 is a side elevation of the device when extended, Figure 3 is a top plan view, with the device partly folded, Figure 4 is an end view, broken away, of the device when folded and inclosing a mattress, and further illustrating the device detachably secured to the running board of a motor vehicle and constituting a luggage retainer or carrier, Figure 5 is a fragmentary view of one end of the device, when extended, partly in section, Figure 6 is a section on line 6—6, Figure 1, Figure 7 is a section on line 7—7, Figure 1, Figure 8 is a view similar to Figure 4, with the device folded to provide a luggage retainer and which is illustrated as being detachably secured to the running board of a motor vehicle.

Referring to the drawings in detail, 1 denotes a flexible body, constructed of canvas or other suitable material and which provides the body portion of the bed when the device is extended to the position shown in Figures 1 and 2. One end of the body 1, is cut away at each corner, as at 2, 3, to provide a clearance. Each side of the body portion 1, is hemmed as at 4, 5, and secured together to provide a longitudinally extending pocket 6, and the head end of the said body 1, is also hemmed as at 7, to form a transversely extending pocket 8. At the foot end of the body 1, it is hemmed as at 9, and secured together to provide a transversely extending pocket 10.

Secured to the foot end of the body 1, is a flexible cover member 11, which can be positioned over the person using the bed and constitutes a covering. The member 11, is formed of any suitable material and includes straps 12, buckle 13, strings or cords 14, and side extensions 15. The member 11, has the forward portion thereof, which is indicated at 16, of less width than the rear portion which is indicated at 17, and the portion 16 of less width, is secured to and projects from the body 1. The side extensions 15 are rectangular in contour and each has the inner marginal portion thereof, as indicated at 18, secured to the portion 16, of less width than the member 11. A part of the rear marginal portion of each of the members 15, is secured as at 19, to the wider portion 17, of the member 11. The extensions 15, are of a length as not only to project laterally from the portion 16, of smaller width than the member 11, but also to project laterally from the portion 17, of greater width than the member 11. The straps 12, buckles 13 and strings or cords 14, are employed for securing the member 11, together, as well as with the body 1, and the other elements of the device, when the latter is folded. The member 11, can also be employed, to inclose luggage, packages, or as illustrated in Figure 4, a mattress 20, whereby the article inclosed by the member 11, will be protected from inclement weather. The mattress 20, is illustrated by way of example, and it is to be understood that the member 11, can be employed to protect any other article or package. If desired, when the device is detachably secured to the running board 21, of a motor vehicle, as illustrated in Figures 4 and 8, the member 11, can be extended and connected with the motor vehicle body, so as to protect luggage or other articles mounted on the running board 21, and retained thereon by the device.

A convertible camp bed and luggage carrier of retainer device, in accordance with this invention, includes a foldable supporting frame, for the body 1, and said frame consists of a pair of side bars, each formed of two sections 22, 23, consisting of hollow tubes, and fixedly secured within the sections 23, by the hold-fast device 24, is an arm 25, extending into the section 22, and which is pivotally connected to said section 22, as at 26. The arm 25, is positioned at the opposed ends of the sections 22, 23, and the section 23, is slotted, at 27, so that said section 22 can swing on the pivot 26, when desired. The arm 25, and pivot 26, form a hinged connection between the sections 22, 23, and by this arrangement, the section 22, can be swung at an angle with respect to section 23. The frame further includes an end rail 28 termed a rail element, which extends through the pocket 8, and is carried by the body 1. Each end of the rail 28, has an outwardly projecting strap 29, which extends around the sections 22, of the side rail, whereby the end rail 28, is permanently connected to the sections 22. The straps 29, are secured to the end rail 28, by the hold-fast devices 30. The supporting frame further includes an end rail, formed of two sections 31, 32, which are swivelly connected together at their opposed inner ends, as at 33, and the outer end of each of the sections 31, 32, is reduced as at 34, and is extended into the bifurcated end 35, of the section 23. The reduced outer ends 34, of the sections 31, 32, are secured to the bifurcated end of the section 23, by the hold-fast devices 36. The end rails formed by the sections 31, 32, extend through and project from the pocket 10. The end rail 28, projects laterally from the ends of the pocket 8.

Mounted on the end rail 28, is a pair of annular coupling members 37, which are arranged between the straps 29, and to the inner portion of which, is secured, as at 38, to the flexible cables 39 and 40. Cables 39 and 40 extend through the pockets 6 and are secured to the sections 31, 32, of the end rail, which is arranged at the foot of the body 1.

The body 1, at the side hemmed portions thereof, is formed with a series of openings and the openings at one side are indicated at 41, and the openings at the other side, at 42. Extending through the openings 41, 42, are metallic coupling members 43, in the form of links, and through said members 43, extend the sections 22, 23, of the side rails, under such conditions the body portion 1 is coupled with the side rails. The inner portions of the coupling members 43, are contracted as at 44, whereby the side rails will be spaced from the body 1, when the device is extended and as illustrated in Figure 1.

Each of the sections 22, of the side rails, near the head of each of said rails is formed with a series of openings 45, and carried by the end rail 28, is a pair of brackets 46, provided with oppositely extending latch bolts 47, which are adapted to engage in the openings 45, of the sections 22, for the purpose of maintaining the body 1 extended, as shown in Figure 1.

Hinged to the free ends of the sections 22, of the side rails, as at 48, are foldable supporting legs 49, which are adapted when the device is folded, to be positioned against the sections 22. The legs 49, are adapted to support the head of the bed when the device is extended, as shown in Figure 2 of the drawings.

Mounted on the sections 31, 32, of the end rail which is arranged at the foot of the bed, when the device is extended, is a pair of yokes 50, which are interposed between the body 1, and the sections 23, of the side rails. The yokes 50, are provided for connecting to the sections 31, 32, a pair of triangular-shaped supporting brackets, referred to generally by the reference characters 51, 52. Each of the brackets 51, 52, comprises a supporting arm 53, a standard 54, and a connecting arm 55. The supporting arm 53, and connecting arm 55, of the bracket 52, are of greater length than the supporting arm 53, and the connecting arm 55, of the bracket 51. The standard 54, of each of the supporting brackets 51, 52, has a loop-shaped upper terminal, as indicated at 56, and which is offset with respect to the standard and the free end of said loop-shaped upper terminal 56, is provided with a clamping screw 57. The loop-shaped upper terminal 56, of the standard 54, projects above the supporting arm 53, the latter extends forwardly from the standard 54, and carries a hinged link 58, to which is attached a strap 59, for the purpose of detachably securing the arm 53, to a side rail. The connecting arm 55, is formed integral with the standard at a point above its lower end, and the upper end of the arm 55, projects above the arm 53, and is provided with a curvilinear clamping member 60, which when the bracket is in supporting position, extends upwardly between the body 1, and the side rails.

When the device is extended, the contracted inner portions 44, of the coupling members 43, are supported on the arms 53, of the brackets 51, 52.

Carried by the arm 55, and arranged below the side rail, is a shiftable clamping member 61, which associates with the clamping member 60. The lower terminus of the standard 54, is pointed as at 62, to provide for its convenient entry in the ground as illustrated in Figure 1.

When the device is folded and is to be used as a luggage retainer or carrier, the standards 54, of the supporting brackets 51, 52, are mounted upon the running board 21, of the vehicle, and with the looped terminals 56, of the standard 54, extended around the outer edge of the running board 21. The screws 57, are then adjusted to binding engagement with the running board 21, whereby the device is detachably secured to the running board 21, in the position as shown in Figures 4 and 8 of the drawings.

When the device is folded, the bolts 47, are released from the sections 22, of the side rails and the body 1 together with the end rail 28, is shifted on the side rails, in a manner as indicated in Figure 3, of the drawings, until the side rail 28 clears the pivoted ends of the sections 22, then one of the sections 22, is swung on its pivot, to be engaged and held by the clamping members 60 and 61, of the supporting arm 53, of smaller length than the supporting bracket 51, the other section 22, then shifted or swung so as to be engaged by the clamping members 60, 61, of the supporting arm 53, of the bracket 51. The position to which the sections 22, of the side rails are swung when the device is folded is illustrated in Figure 3. The member 11, is then wrapped around the folded elements of the device and secured together, and if said member 11, is not inclosing any article or package, it will be in the position as shown in Figure 8, but if inclosing an article, by way of example, the mattress 20, it will be in the position shown in Figure 4. After the device has been folded, it is clamped to the running board 21, of the motor vehicle, in a manner as shown in Figure 4, of the drawings.

From the foregoing description, taken in connection with the accompanying drawings, a novel construction of convertible camp bed and luggage carrier or retainer is set up, but it is to be understood that the invention is not limited to the details of construction as described and shown, as various elements of the construction can be modified to an extent which will fall within the scope of the invention.

What we claim is:—

1. A device for the purpose set forth comprising a pair of sectional and foldable side rails, and an end rail, an end rail element, means for slidably connecting said element to said side rails, a foldable flexible body connected to said element and end rail, means for adjustably positioning said element longitudinally of the side rails to maintain said body extended, supporting legs hinged to said side rails, coupling members for connecting said body to said side rails, and supporting brackets carried by the end rail.

2. A device for the purpose set forth comprising a pair of sectional and foldable side rails and an end rail connecting one end of said side rails together, an end rail element, means for slidably connecting said element to said side rail, a foldable flexible body connected to said element and end rail, means for adjustably positioning said element longitudinally of the side rails to maintain said body extended, supporting legs hinged to the other end of said side rails, coupling members for connecting said body to said side rails, supporting brackets carried by the end rail inwardly with respect to the side rails, and clamping elements carried by the supporting brackets for securing said side rails in folded position.

3. A device for the purpose set forth comprising a foldable frame, a foldable flexible body connected thereto, foldable supporting legs for one end of the frame, brackets connected to said frame and each comprising a supporting arm for said body and a supporting standard for the other end of the frame and further including a connecting arm between the supporting arm and the standard, clamping members carried by said supporting arm for retaining the frame in folded position, and clamping elements carried by said standards for securing the frame when folded to a support.

4. A device for the purpose set forth comprising a foldable frame including a pair of side and a pair of end rails, said side rails being foldable, means for fixedly securing an end rail to the side rails, means for slidably mounting the other of said end rails on said side rails, foldable supporting legs carried by the side rails, a foldable flexible body adjustably mounted on said side rails and connected to said fixed end rail, supporting brackets connected to the fixed end rail inwardly with respect to the side rails, and clamping members carried by the upper portions of said brackets and engaging with the side rails for maintaining the frame and said body in folded position.

5. A device for the purpose set forth comprising a foldable frame consisting of a pair of foldable side rails, a fixed end rail and a shiftable end rail, means for slidably connecting the shiftable end rail to the side rails, a foldable flexible body having its ends connected to said end rails, flexible connections extending through said body and connected to said end rails, coupling members between said body and said side rails, means carried by the shiftable end rail and engaging in the side rails for maintaining said body extended, foldable supports for one end of said frame, and supporting elements for the other end of the frame, said supporting elements carried by the fixed end rail and arranged inwardly with respect to the side rails.

6. A device for the purpose set forth comprising a foldable frame consisting of a pair of foldable side rails, a fixed end rail and a shiftable end rail, means for slidably connecting the shiftable end rail to the side rails, a foldable flexible body having its ends connected to said end rails, flexible connections extending through said body and connected to said end rails, coupling members between said body and said side rails, means carried by the shiftable end rail and engaging in the side rails for maintaining said body extended, foldable supports for one end of said frame, supporting elements for the other end of the frame, said supporting elements carried by the fixed end rail and arranged inwardly with respect to the side rails, and clamping elements carried by said supporting elements and adapted to engage with the side rails for maintaining the supports in folded position.

In testimony whereof, we affix our signatures hereto.

CHARLES HAMMOND.
LAWRENCE S. OGLE.